United States Patent Office 2,917,855
Patented Dec. 22, 1959

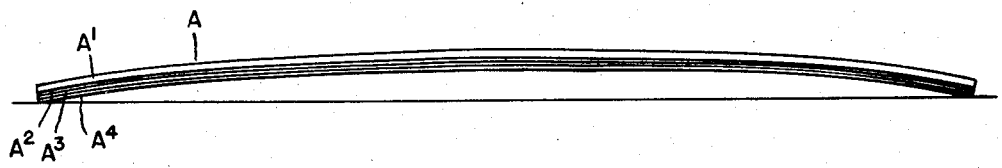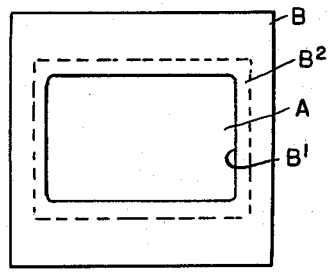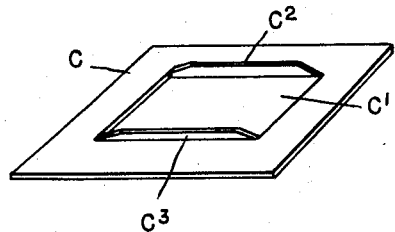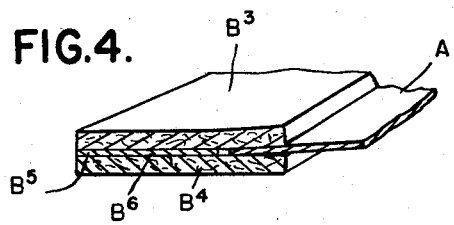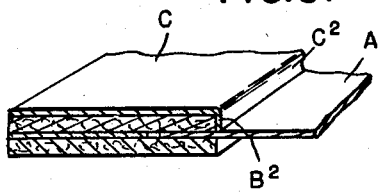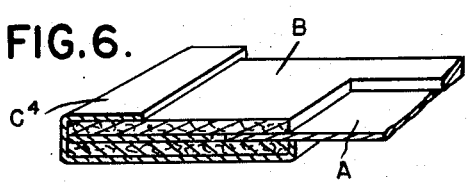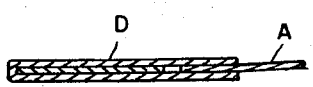

2,917,855

ANTI-POPPING DEVICE FOR STILL PICTURE FILM PROJECTORS

Samuel F. Schneider, Ann Arbor, Mich.

Application April 29, 1957, Serial No. 655,890

3 Claims. (Cl. 40—152)

The invention relates to picture film projectors and more particularly to that type in which the individual picture film is marginally attached to a mounting frame by which it is placed in operative relation to the projector apparatus. With such constructions, the film is subject to considerable heat from the light passing therethrough when the picture is projected on the screen which causes expansion and frequently results in what is termed "popping." This is due to differential expansion of the several layers composing the film producing a sudden warping thereof which requires refocusing to restore clarity in the picture. Also, when one film or slide is exchanged for another, further focusing will be necessary.

It is the object of the invention to avoid such popping and to this end the invention consists in the construction of anti-popping means as hereinafter set forth.

In the accompanying drawings:

Fig. 1 is an elevation of an individual picture film in its mounting frame.

Fig. 2 is a perspective view of the template which, when applied to the mounted film of Fig. 1, prevents popping.

Fig. 3 is a greatly enlarged cross section through a picture film showing the same in its natural warped condition prior to placing the same in the projector; also showing the several layers composing the film exaggerated in thickness.

Fig. 4 is an enlarged sectional perspective view of one side of the mounted film before applying the anti-popping device thereto.

Fig. 5 is a similar view with the anti-popping device applied.

Fig. 6 and Fig. 7 are similar views showing modified constructions.

As illustrated in Fig. 3, an individual picture film A is composed of a supporting plastic layer $A^1$ and a plurality of sensitized layers $A^2$, $A^3$ and $A^4$ on one side of the layer $A^1$. These sensitized layers have a warping effect upon the supporting layer so that normally the film will not lie in a perfect plane. However, under heat there is differential expansion which tends to restore the film more nearly into a plane. It is obvious that when the film is subjected to the intense light of the projector apparatus, it will be very quickly heated. This, as above described, is the cause of popping.

As shown in Fig. 1, the film A is mounted in a frame B which may be formed of paperboard being cut out at $B^1$ to expose the picture but with the marginal portion $B^2$ overlapping the frame. In one construction used for this purpose the frame is formed from a folded cardboard strip with cutout apertures therein in registration and with the marginal portion of the film extending therebetween. This is shown enlarged in Fig. 4 in which $B^3$ and $B^4$ are the registering portions of the folded strip secured to each other along their outer edges as indicated at $B^5$ but having a cutout paper strip $B^6$ therebetween spacing them for the reception of the marginal portion of the film A. Fig. 4 also shows the film A as bowed or warped.

Fig. 2 illustrates a metallic template C which corresponds in dimensions to the frame B and is cut out at $C^1$ to correspond to the apertures $B^1$ of the frame. On opposite sides of this cutout $C^1$ flanges or lips $C^2$ and $C^3$ are turned to extend transverse to the plane of the template and to fit within the aperture $B^1$ close to the margin thereof.

Fig. 5 shows the template as placed on the frame with the flanges such as $C^2$ extending into the aperture $B^1$ with its edge bearing upon the film A. This has the effect of, to some extent, flattening the film to more nearly approach the plane. I have found that the template so applied will effectually prevent popping when inserted into the projecting device and subjected to the heating effect of light transmitted therethrough. My understanding of the action is that it is the straightening effect exerted on the film by the flanges or lips $C^2$ and $C^3$. Whether or not this understanding is proved, it is a demonstrated fact that the template does prevent popping when it is applied to the mounted film as just described.

As the mounted film forms a slide to be inserted into or withdrawn from the projecting apparatus, it is necessary to attach the template C thereto. This may be accomplished as shown in Fig. 6 by providing the template with return bent flanges $C^4$ for engaging opposite edges of the frame B and for also pressing the flanges or lips $C^2$ and $C^3$ against the film.

The mounting frame for the film as above described is only one construction and various others may be used for the same purpose. For instance, as shown in Fig. 7, the film is mounted in a metallic frame D which is of a return bent cross section to embrace the marginal portion of the film. The template C may be applied to this mounting in the same manner as above described and will have the same effect in preventing popping.

What I claim as my invention is:

1. In combination with a photographic picture film mounted between two flat sheets having similar central openings for exposing the picture portion of said film while clamping the marginal portions of said film thereby forming a unit mounting for a viewer, of a separate flat rigid plate adapted to overlie one of the sheets of said unit mounting, said plate having a central opening with two inturned flanges at opposite edges thereof projecting inwardly for a distance corresponding to the thickness of the sheet for firmly contacting the film at such edges only and thereby applying sufficient pressure on said film to prevent popping.

2. In combination with a photographic picture film mounted between two cardboard frames and secured together to form a picture slide for a viewer, of a separate flat rigid plate having parallel inturned flanges adapted to engage said film at the margins only of its picture portion when said plate is engaged with said slide, and means for clamping said rigid plate to said slide to continuously maintain the pressure between said inturned flanges and the film thereby preventing popping from the heat of the projector.

3. A slide assembly for a projector comprising a picture mounting, an auxiliary plate and means for retaining the plate in engagement with said picture mounting, said picture mounting consisting of a photographic picture film mounted between two flat cardboard sheets having central openings for exposing the picture portion of said film while clamping the marginal portions of said film therebetween, said auxiliary plate having a corresponding opening with two inturned parallel flanges for engaging said film at the marginal edges of said picture opening to thereby maintain pressure on said film and prevent popping under the heat of the projector.

References Cited in the file of this patent

UNITED STATES PATENTS

| | | |
|---|---|---|
| 1,567,310 | Weeks | Dec. 29, 1925 |
| 2,496,008 | Jablon | Jan. 31, 1950 |